United States Patent [19]

Park

[11] Patent Number: 5,636,913
[45] Date of Patent: Jun. 10, 1997

[54] PROJECTION-LENS DRIVING APPARATUS FOR USE IN A 3-BEAM PROJECTOR

[75] Inventor: Jun-Hyun Park, Seoul, Rep. of Korea

[73] Assignee: Daewoo Electronics Co., Ltd, Seoul, Rep. of Korea

[21] Appl. No.: 524,711

[22] Filed: Sep. 7, 1995

[30] Foreign Application Priority Data

Sep. 8, 1994 [KR] Rep. of Korea ............... 94-22583

[51] Int. Cl.$^6$ ............... G03B 21/53; G02B 15/14
[52] U.S. Cl. ............... 353/101; 353/100; 359/694; 359/703
[58] Field of Search ............... 353/100, 101, 353/31, 122; 359/821, 822, 823, 826, 694, 695, 696, 699, 700, 701, 649; 348/745, 806

[56] References Cited

U.S. PATENT DOCUMENTS

| | | |
|---|---|---|
| 4,854,697 | 8/1989 | Krowbauer et al. ............ 353/94 |
| 5,026,149 | 6/1991 | Braat ............ 359/649 |
| 5,125,733 | 6/1992 | Lee ............ 353/7 |
| 5,463,434 | 10/1995 | Kanayama et al. ............ 353/7 |

*Primary Examiner*—William C. Dowling
*Attorney, Agent, or Firm*—Anderson Kill Olick & Oshinsky, P.C.

[57] ABSTRACT

The projection-lens driving apparatus for a 3-beam projector includes a housing, a triplet of cylindrical projection-lens holders, a pair of cam members, each of the cam members having a triplet of guide rails, a trifurcating member, a driving means provided with a feed screw and a motor, three pairs of brackets, three pairs of feed rollers, one end of each of the brackets coupled to one of the feed rollers which, in turn, is coupled to one of the guide rails, the other end thereof being coupled to one cylindrical projection-lens holder, and a triplet of guiding means, each of the guiding means mechanically coupling one of the cylindrical projection-lens holders with the housing. The pair of cam members and the cylindrical projection-lens holders are mechanically coupled through the feed screw of the driving means to allow a synchronous movement of the components constituting the apparatus.

2 Claims, 7 Drawing Sheets

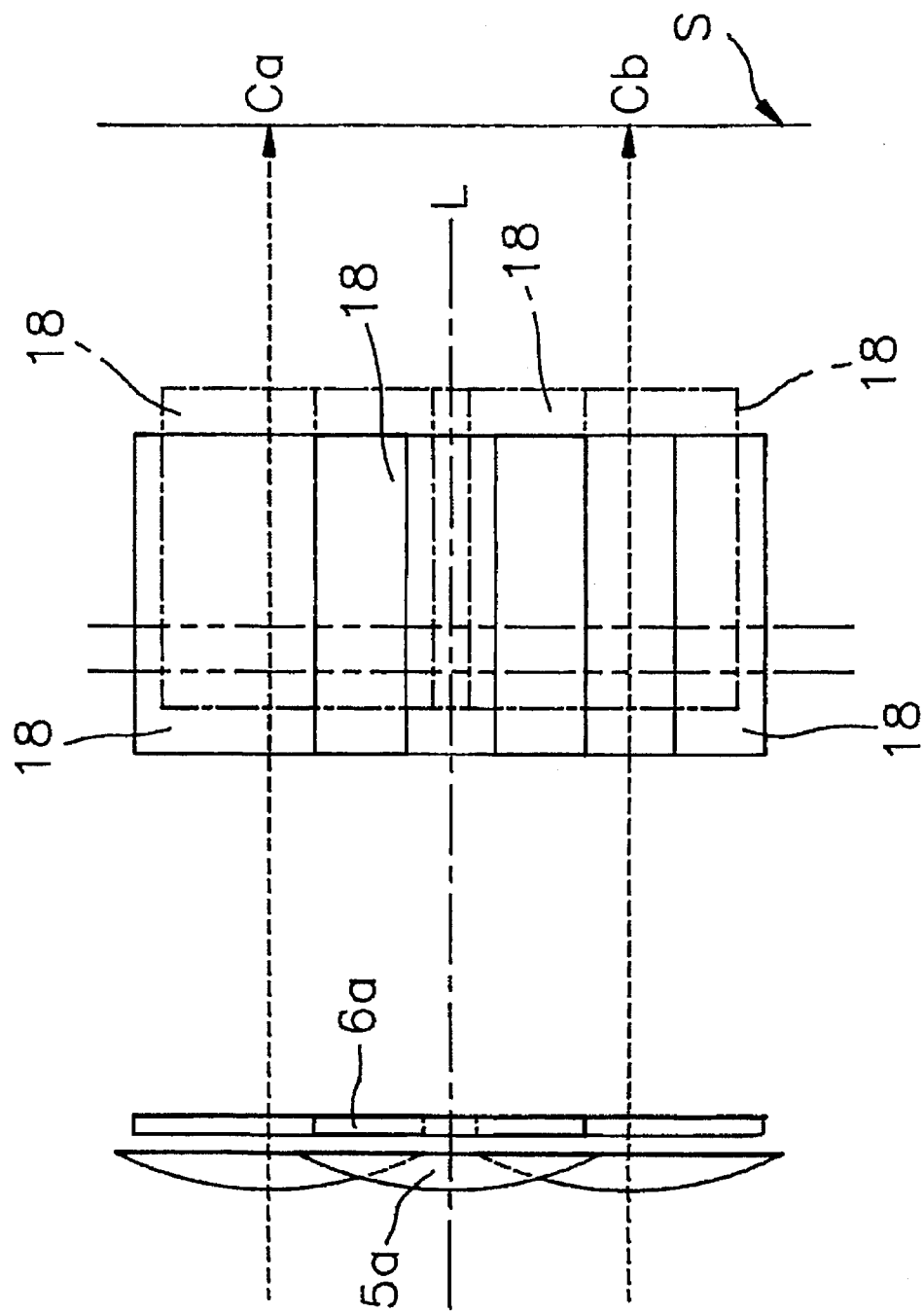

PROJECTION-LENS DRIVING APPARATUS FOR USE IN A 3-BEAM PROJECTOR

FIELD OF THE INVENTION

The present invention relates to a projection-lens driving apparatus for use in a 3-beam projector; and, more particularly, to an improved projection-lens driving apparatus capable of synchronously driving three cylindrical projection-lens holders to thereby provide a simultaneous focussing of three images on a screen.

DESCRIPTION OF THE PRIOR ART

As shown in FIG. 1, a conventional 3-beam projector typically comprises three image-projecting units $1a$, $1b$ and $1c$, each of the image-projecting units, e.g., $1a$, including a lamp $4a$, a spherical reflecting mirror $3a$, a focusing lens device $5a$, a slide film or LCD (liquid crystal display) panel $6a$ and a projecting lens $7a$, respectively. Each of the image-projecting units, e.g. $1a$, is provided with an associated optical axis La. Each of the image-projecting units $1a$, $1b$ and $1c$ is individually driven to coincide each of the images to thereby to produce a stereoscopic image on a screen S having a central axis L, the central axis L being normal to the screen. Specifically, in order to produce a stereoscopic image the screen S, an operator first focuses an image projected from one of the units, e.g, $1a$, on the screen S and then focuses and moves the remaining images projected from the other units $1b$, $1c$ on the screen S to coincide the three images.

There are a number of disadvantages with such a 3-beam conventional projector. The optical axes Lb, Lc of the units $1b$ and $1c$ are normally inclined at a certain angle with respect to the central axis L of the screen S so that each of the images projected from the corresponding image-projecting unit has a trapezoidal shape as shown in FIG. 2, resulting in a keystoning phenomenon, the keystoning phenomenon referring to a distortion of images caused by a failure for the images to coincide completely with each other, causing an eye fatigue or irritation to viewers. In addition to the above, the task of coinciding and focusing the three images on the screen S becomes rather tricky and inconvenient, since each of the three image-projecting units must be individually driven and adjusted.

SUMMARY OF THE INVENTION

It is, therefore, a primary object of the present invention to provide an improved projection-lens driving apparatus capable of concertedly driving three cylindrical projection-lens holders to thereby allow a simultaneous focusing of images on the screen.

In accordance with one aspect of the present invention, there is provided with a projection-lens driving apparatus for use in a 3-beam projector, comprising:

a housing having a substantially pentahedral shape with a triplet of first side surfaces and a triplet of flat surfaces wherein each of the flat surfaces is provided with a through hole;

a triplet of cylindrical projection-lens holders with a side surface, the side surface including a fastening hole aligned with one of the through holes;

a trifurcating member having three arms and a connecting portion with a threaded through hole, each of the arms being separated from each other by 120 degrees, one end of each of the arms joined to each of the first side surfaces, the other end terminating at the connecting portion, thereby dividing the housing into three equal spaces, each of the spaces accommodating one of the cylindrical projection-lens holders a pair of cam members, each of the cam members including a screw inserting hole with a set of bearings to be aligned with the threaded through hole of the connection portion of the trifurcating member, each of the cam members having a substantially pentahedral shape with a triplet of flat inclined surfaces and a triplet of flat side surfaces, each of the flat side surfaces running parallel to the corresponding first side surface of the housing, and each of the flat inclined surfaces being provided with a guide rail;

a triplet of guiding means, each of the guiding means including a guiding rod and a spring, wherein each of the guiding rods is inserted through the through holes and the fastening hole in a corresponding cylindrical projection-lens holder, the spring being inserted along with the guiding rod so as to provide an elastic force needed to control the movement of each of the cylindrical projection-lens holders toward or away from the center of the housing;

three pairs of feed rollers;

three pairs of brackets, each pair of brackets being placed on one of the cylindrical projection-lens holders, wherein one end of each of the brackets is joined to the side surface of the projection-lens holders and the other end is connected to a corresponding feed roller, each of the feed rollers, in turn, being mechanically coupled to one of the guide rails on the inclined surface in each of the cam members; and a driving means including a feed screw and a motor, wherein the feed screw is inserted into the threaded through hole and the feed screw inserting hole through one end and the other end thereof is mechanically coupled to the motor, thereby allowing the pair of cam members and the triplet of cylindrical projection-lens holders to be mechanically coupled to the motor, thereby allowing a synchronous movement of the components constituting said apparatus.

BRIEF DESCRIPTION OF THE DRAWING

The above and other objects and features of the present invention will become apparent from the following description of preferred embodiments when taken in conjunction with the accompanying drawings, in which:

FIG. 7 describes an explanation of the method for driving an upper and a pair of lower projection-lens holders in accordance with the present invention.

DETAILED DESCRIPTION OF THE PREFERRED EMBODIMENT

Figure 1:
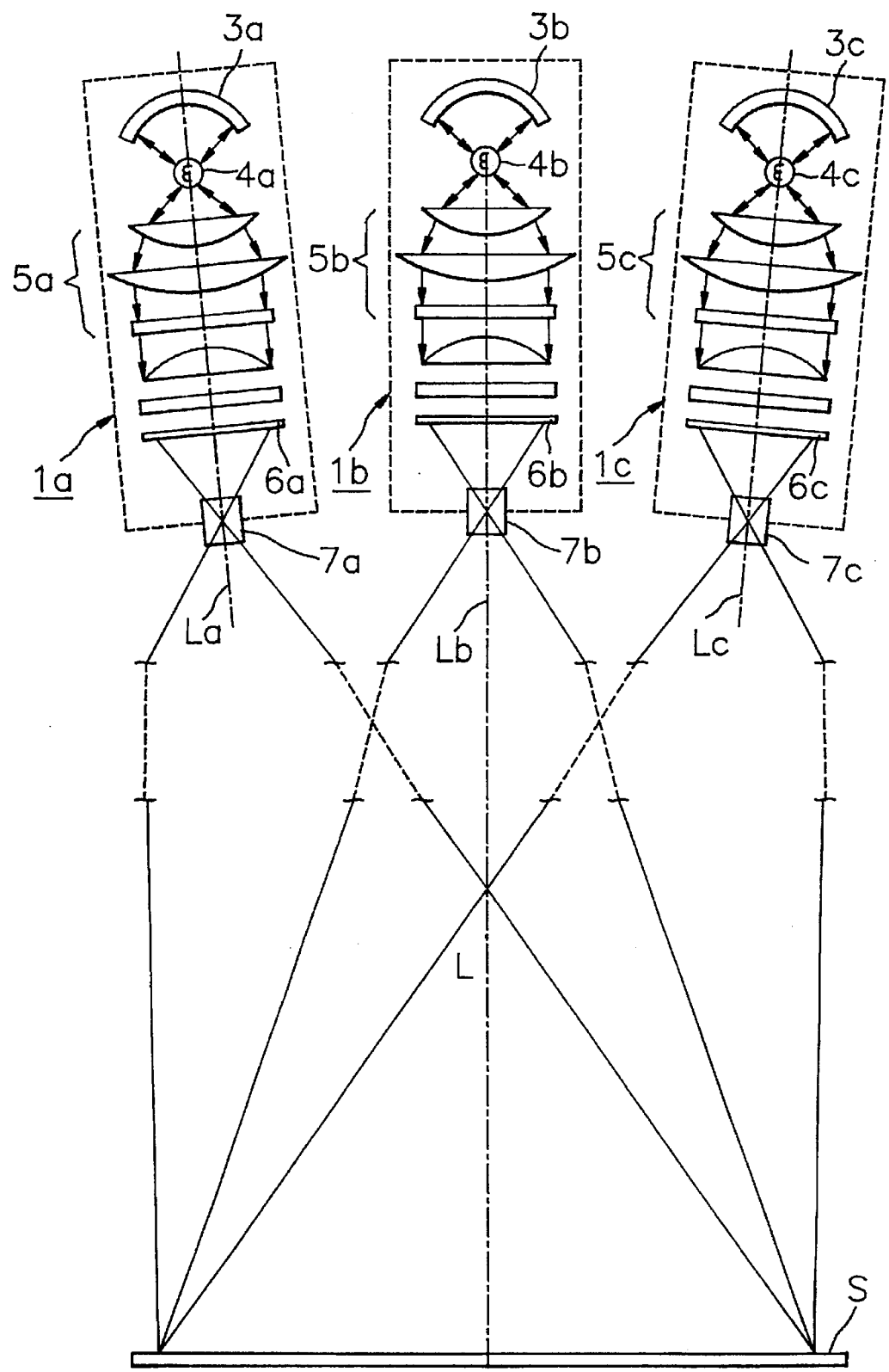
FIG. 1 presents a schematic view of a conventional stereoscopic image projector.
Figure 2:
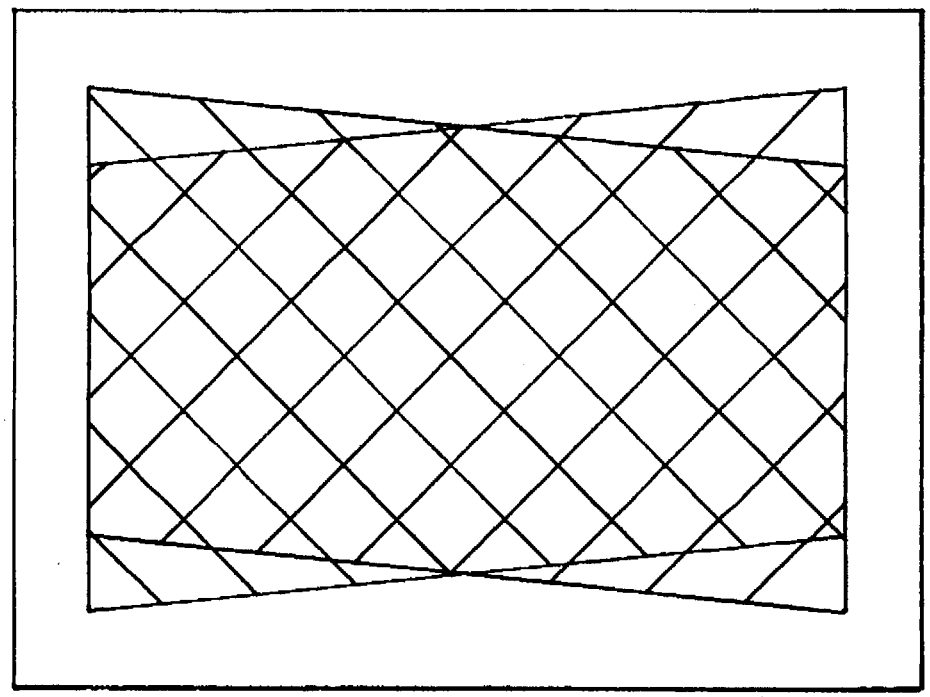
FIG. 2 depicts a schematic view of images produced on a screen in accordance with the conventional stereoscopic image projector.
Figure 3:
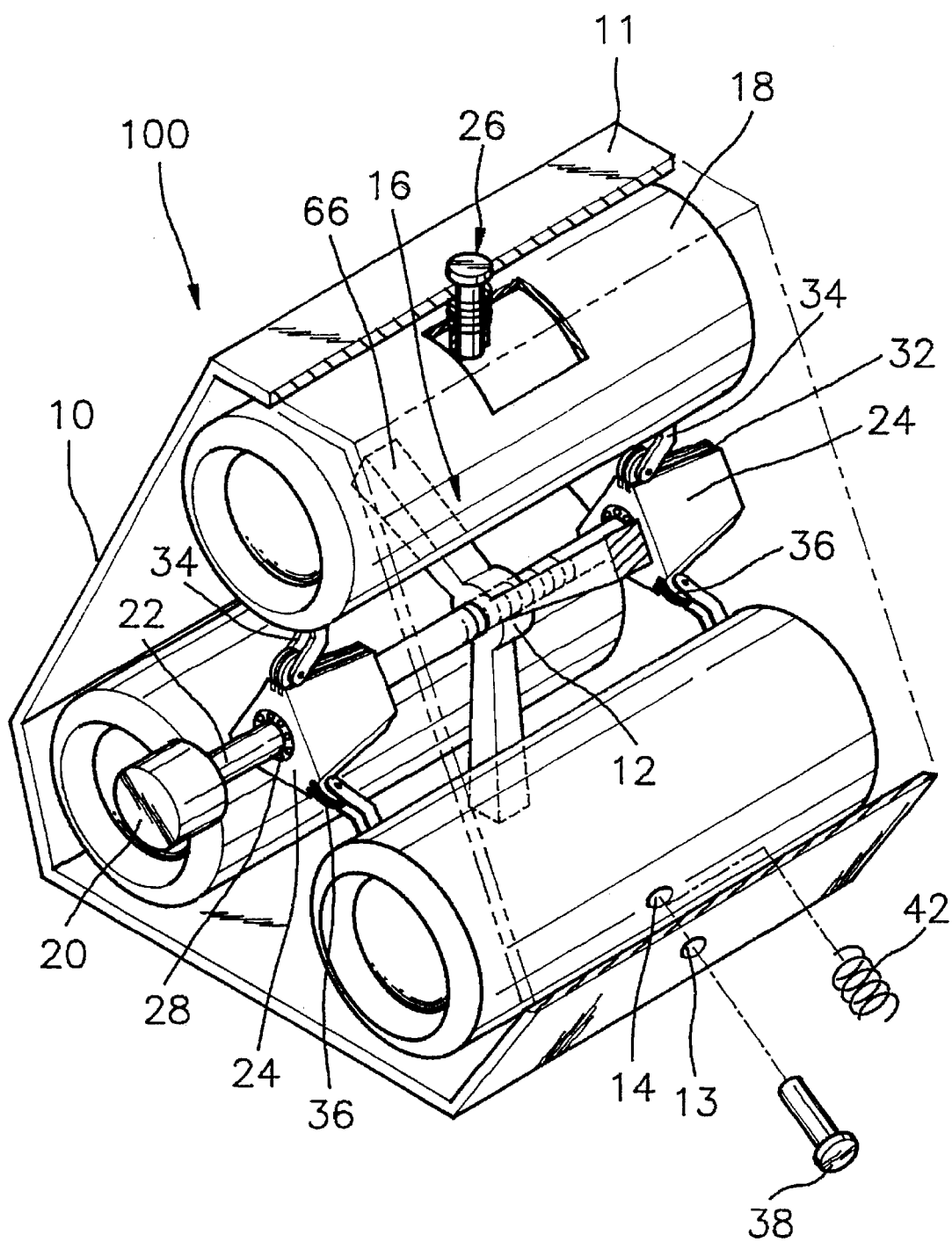
FIG. 3 shows a partially cutaway rear perspective view of a preferred embodiment of the projection-lens driving apparatus in accordance with the present invention.

There is shown in FIG. 3 a partial cutaway perspective view of an inventive projection-lens driving apparatus 100 including a housing 10, a triplet of cylindrical projection-lens holders 18, a trifurcating member 16, a pair of cam members 24, a feed screw 22, a triplet of guiding means 26, three pairs of brackets 34, three pairs of feed rollers 36, and a motor 20.

The housing 10, as shown in FIG. 3, is near pentahedral in its shape with the edges formed by four-sided side surfaces joining each other truncated in such a way that three flat surfaces 11 are additionally formed. Each of the flat surfaces 11 is provided with a first through hole 13. Furthermore, the housing 10 is equally divided into three identically sized spaces by the trifurcating member 16, each of the spaces accommodating one of the cylindrical projection-lens holders 18. Each of the cylindrical projection-lens holders 18 is provided with a projection lens at its front and rear ends thereof, respectively, and a fastening hole 1 at its side surface, each of the fastening holes 14 in each of the cylindrical projection-lens holders 18 being aligned with the first through holes 13 on the flat surfaces 11.

The trifurcating member 16 is provided with three arms, each of the arms 66 being separated by an angle of 120 degrees, and a connecting portion 12. One end of each of the arms 66 being fixed to one of the four-sided surfaces of the housing 10 and the other end being joined to the connecting portion 12. The connecting portion 12 includes a threaded through hole 17 at its center portion.

Each of the cylindrical projection-lens holders 18 is provided with a pair of brackets 34, the pair of brackets 34 being located at diagonally opposite side of the fastening hole 14 in each of the cylindrical projection-lens holders 18 and each of the brackets 34 in the pairs being aligned to each other, wherein one end of each of the brackets 34 is joined to the side surface of the cylindrical projection-lens holder 18 and the other end supports one of the feed rollers 36. Each of the cylindrical projection-lens holders 18 is mechanically coupled to the housing 10 via the guiding means 26 including a spring 42 and a guide rod 38, the guide rod 38 being inserted into the first fastening through hole 13 and the fastening hole 14 on the cylindrical projection-lens holder 18. The spring 42 in each of the guiding means 26 provides an elastic force vectored toward or away from a center of the housing 10.

Figure 4:
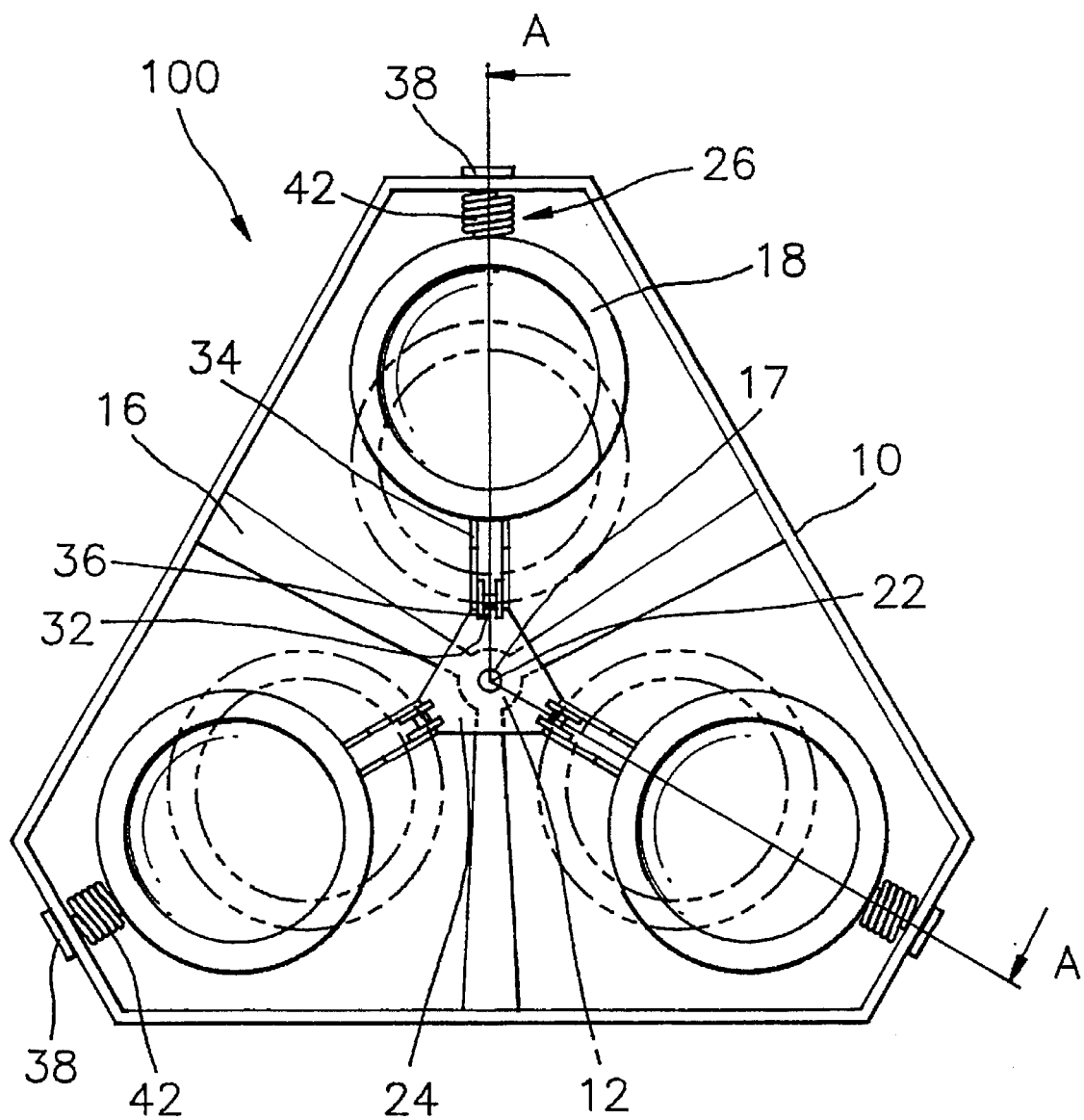
FIG. 4 represents a plan view of the projection-lens driving apparatus shown in FIG. 3, showing the operation thereof.
Figure 5:
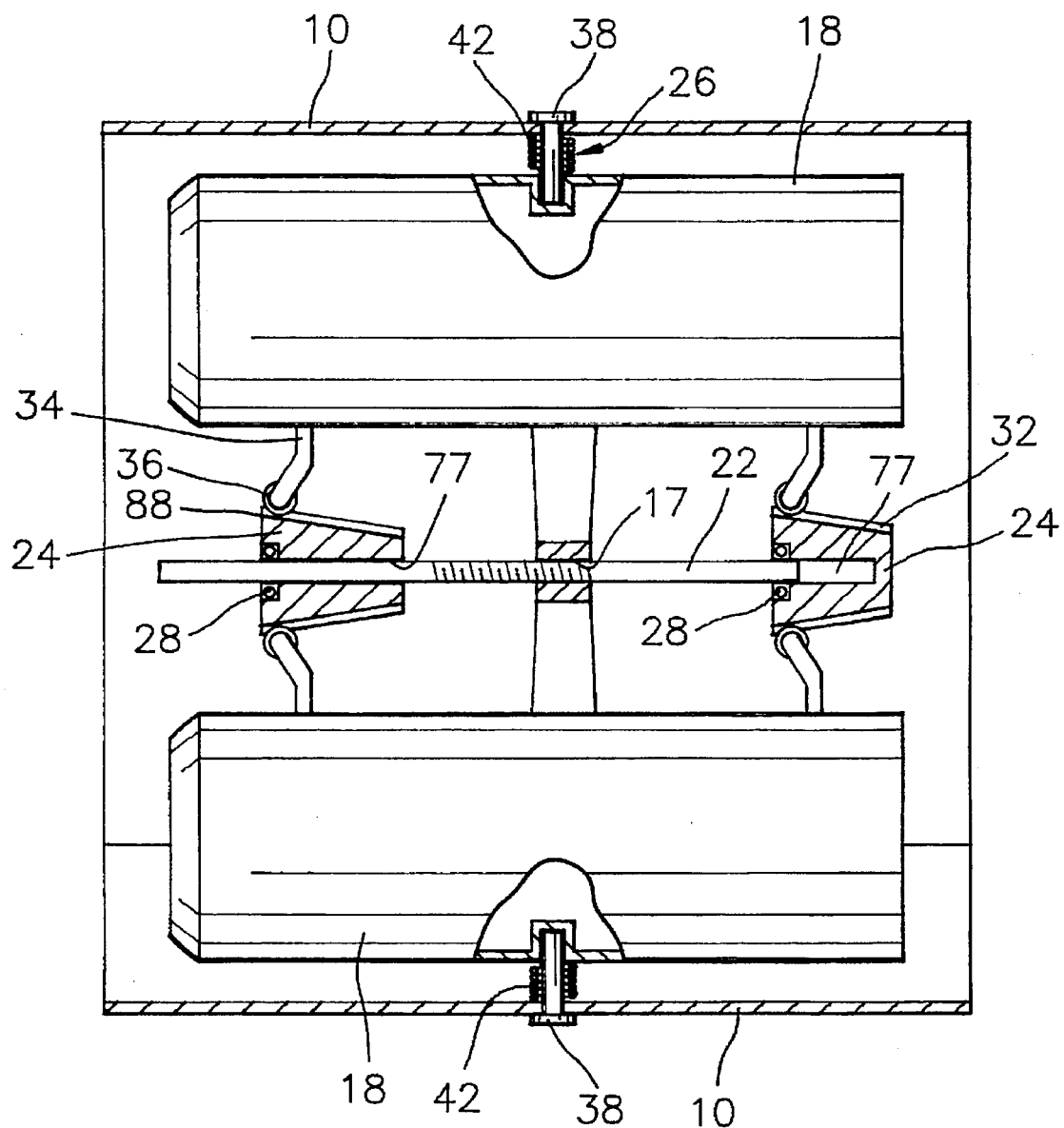
FIG. 5 provides a cross sectional view taken along line A—A of FIG. 4.

As shown in FIGS. 4 and 5, each of the cam members 24 is of a substantially pentahedral form with the edges formed by the four-sided side surfaces joining each other truncated in such a way that three flat surfaces 88 with an inclination are additionally created, running from the front end of the cylindrical projection-lens holders 18 to the rear end thereof or the vice versa. Each of the cam members 24 is provided with a feed screw inserting hole 77 including a set of bearings 28. Each of the flat surfaces 88 on each of the cam members 24 is provided with a guide rail 52, respectively. Each of the guide rails 32 on each of the cam members 24 is mechanically coupled to a corresponding feed roller 36.

The feed screw 22, one end of which is attached to the motor 20, is inserted through the feed screw inserting hole 77 in each of the cam members 24 and the threaded through hole 17 of the connecting portion 12 of the trifurcating member 16, to thereby mechanically couple the components constituting the apparatus 100. The motor 20 connected to the feed screw 22 is electrically connected to a control switch (not shown) of a control panel (not shown).

Figure 6:
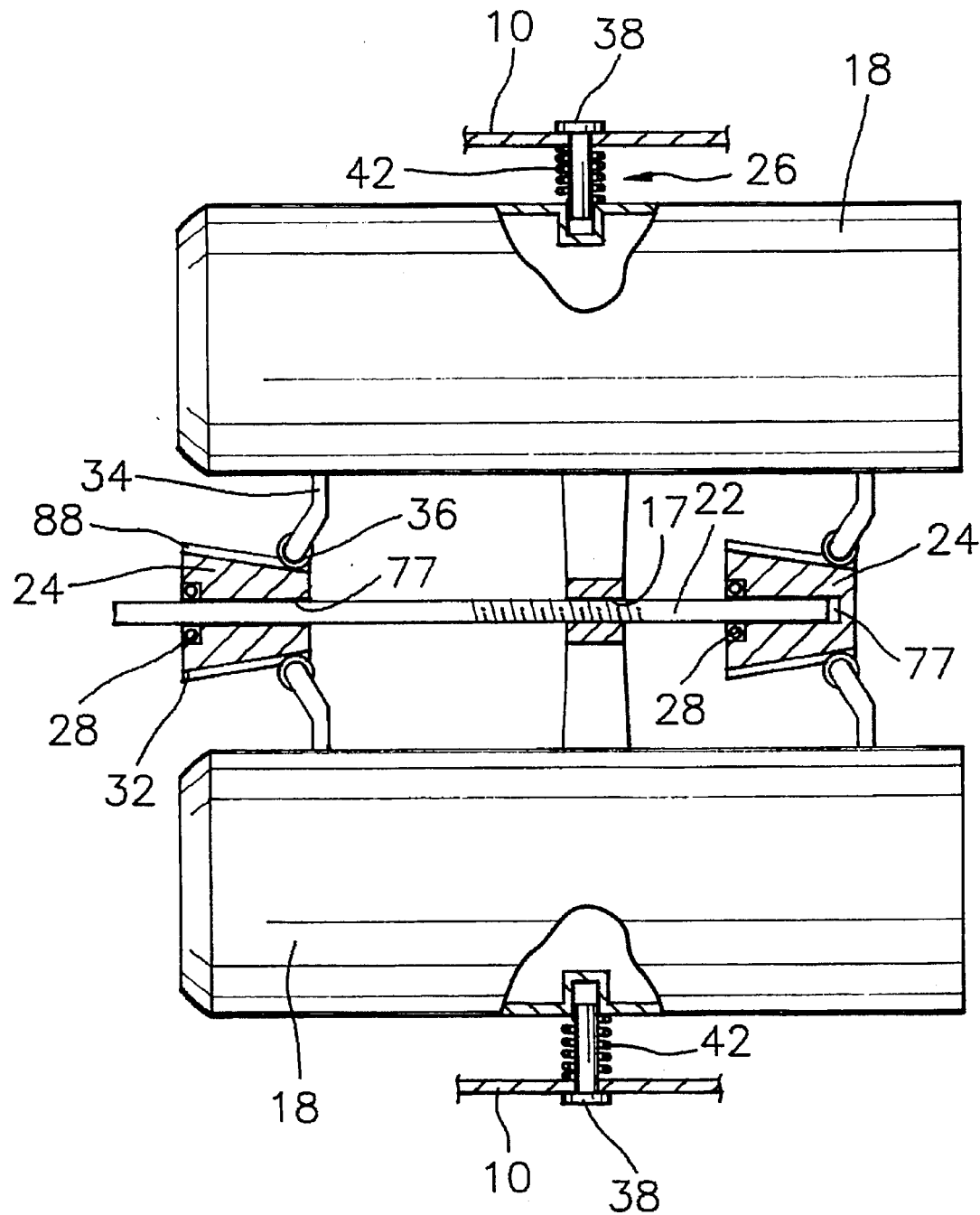
FIG. 6 offers a partial detailed view of the projection-lens driving apparatus shown in FIG. 5, showing a the operation thereof.

The operation of the inventive projection-lens driving apparatus 100 will now be described with reference to FIG. 6. When an operator pushes a control switch on a panel (not shown) in order to focus projected images on a screen, the motor 20 rotates, and in response to the rotation of the motor 20, the feed screw 22 will rotate, allowing three cylindrical projection-lens holders 18 to horizontally slide toward or away from the screen depending on the direction of rotation. To be more specific, in response to the rotation, each of the feed rollers 36 mechanically coupled to one of the guide rails 32 on each of the flat surfaces 88 on the cam member 24 slides downward or upward along the flat surface 88 of the cam member 24. As a result, each of the cylindrical projection-lens holders 18 is urged inward or outward by the action of the corresponding spring 42 in the guide means 26. Accordingly, each of the cylindrical projection-lens holders 18 is integrally driven toward or away from the screen and inward or outward with respect to the center of the housing 10 in the inventive projection-lens driving apparatus 100.

Therefore, by controlling the rotation of the motor 20, each of the cylindrical projection-lens holders 18 can be synchronously driven, allowing the operator to focus the images on the screen simply, conveniently, accurately, and above all, simultaneously.

FIG. 7 is a partial schematic view of a 3-beam projector incorporating therein the inventive projection-lens driving apparatus 100, illustrating its relationship to a screen S and a triplet of LCD panels 6a, 6b and 6c, wherein each of the LCD panels, e.g., 6a, is provided with a respective optical axis Ca, the optical axis Ca being parallel to the central axis L of the screen S.

The cylindrical projection-lens holders 18 are also arranged such that the optical axis of each of the projection lenses is parallel with the respective optical axes Ca, Cb, Cc of the LCD panels 6a, 6b, 6c. The cylindrical projection-lens holders 18 are adjusted to move synchronously toward or away from the screen S and move inward, outward or in parallel with the central axis L of the screen S, thereby enabling the operator to focus and match images simultaneously.

Although the invention has been shown and described with respect to the preferred embodiments, it will be understood by those skilled in the art various changes and modifications may be made without departing from the spirit and scope of the invention as defined in the following claims.

What is claimed is:

1. A projection-lens driving apparatus for use in a 3-beam projector, comprising:

a housing having a substantially pentahedral shape with a triplet of first side surfaces and a triplet of flat surfaces wherein each of the flat surfaces is provided with a through hole;

a triplet of cylindrical projection-lens holders with a side surface, the side surface including a fastening hole aligned with one of the through holes;

a trifurcating member having three arms and a connecting portion with a threaded through hole, each of the arms being separated from each other by 120 degrees, one end of each of the arms joined to each of the first side surfaces, the other end terminating at the connecting portion, thereby dividing the housing into three equal spaces, each of the spaces accommodating one of the cylindrical projection-lens holders;

a pair of cam members, each of the cam members including a screw inserting hole with a set of bearings to be aligned with the threaded through hole of the connection portion of the trifurcating member, each of the cam members having a substantially pentahedral shape with a triplet of flat inclined surfaces and a triplet of flat side surfaces, each of the flat side surfaces running parallel to the corresponding first side surface of the housing, and each of the flat inclined surfaces being provided with a guide rail;

a triplet of guiding means, each of the guiding means including a guiding rod and a spring, wherein each of the guiding rods is inserted through the through holes and the fastening hole in a corresponding cylindrical projection-lens holder, the spring being inserted along with the guiding rod so as to provide an elastic force needed to control the movement of each of the cylindrical projection-lens holders toward or away from the center of the housing;

three pairs of feed rollers;

three pairs of brackets, each pair of brackets being placed on one of the cylindrical projection-lens holders, wherein one end of each of the brackets is joined to the side surface of the projection-lens holders and the other end is connected to a corresponding feed roller, each of the feed rollers, in turn, being mechanically coupled to one of the guide rails on the inclined surface in each of the cam members; and a driving means including a feed screw and a motor, wherein the feed screw is inserted into the threaded through hole and the feed screw inserting hole through one end and the other end thereof is mechanically coupled to the motor, thereby allowing the pair of cam members and the triplet of cylindrical projection-lens holders to be mechanically coupled to the motor, thereby allowing a synchronous movement of the components constituting said apparatus.

2. The projection-lens driving apparatus according to claim 1, wherein the flat inclined surfaces of the cam members are inclined from the front end of the cylindrical projection-lens holders to the rear end thereof or vice versa.

* * * * *